(12) United States Patent
Rankin, VI

(10) Patent No.: US 9,038,272 B1
(45) Date of Patent: May 26, 2015

(54) VARIABLE FORCE SPRING TAPES AND METHOD OF MANUFACTURE

(71) Applicant: Vulcan Spring & Mfg. Co., Telford, PA (US)

(72) Inventor: Alexander Rankin, VI, Dresher, PA (US)

(73) Assignee: Vulcan Spring & Mfg. Co., Telford, PA (US)

( * ) Notice: Subject to any disclaimer, the term of this patent is extended or adjusted under 35 U.S.C. 154(b) by 42 days.

(21) Appl. No.: 13/906,417

(22) Filed: May 31, 2013

Related U.S. Application Data

(60) Provisional application No. 61/655,104, filed on Jun. 4, 2012.

(51) Int. Cl.
*B23P 13/00* (2006.01)
*F03G 1/02* (2006.01)
*B23K 26/08* (2014.01)
*B26D 1/01* (2006.01)
*F03G 1/00* (2006.01)

(52) U.S. Cl.
CPC .............. *F03G 1/02* (2013.01); *B23K 26/083* (2013.01); *B26D 1/015* (2013.01); *F03G 1/00* (2013.01); *Y10T 29/49609* (2015.01)

(58) Field of Classification Search
CPC ........ B23K 26/083; B26D 1/015; F03G 1/02; F03G 1/00; Y10T 29/49609
USPC ........ 29/896.9; 156/193, 250, 259; 83/27, 46; 264/145, 146
See application file for complete search history.

(56) References Cited

U.S. PATENT DOCUMENTS

| | | | |
|---|---|---|---|
| 2,609,193 A | 9/1952 | Foster | |
| 3,194,343 A | 7/1965 | Sindlinger | |
| 3,194,344 A | 7/1965 | Sindlinger | |
| 5,766,730 A * | 6/1998 | Gailey et al. ................ | 428/174 |
| 2006/0073311 A1 * | 4/2006 | Hogg ............................ | 428/174 |
| 2008/0286533 A1 * | 11/2008 | Gotz et al. ................... | 428/192 |
| 2009/0108511 A1 * | 4/2009 | Bivin et al. .................. | 267/167 |
| 2009/0145543 A1 * | 6/2009 | Velasquez Urey et al. ... | 156/252 |
| 2010/0084084 A1 * | 4/2010 | Miller, II ..................... | 156/249 |

* cited by examiner

*Primary Examiner* — Ryan J Walters
(74) *Attorney, Agent, or Firm* — Howson & Howson LLP

(57) ABSTRACT

A spring tape suitable for use in spring motor applications where reactive torque varies with rotational deflection. An elongate elastic element is advanced lengthwise and is laser cut into longitudinally complementary shapes which are separated and subsequently pre-stressed into rolls which are cut to length for assembly into a spring motor.

16 Claims, 3 Drawing Sheets

US 9,038,272 B1

VARIABLE FORCE SPRING TAPES AND METHOD OF MANUFACTURE

BACKGROUND OF THE INVENTION

It is known to provide spring motors having longitudinally symmetrical tapered flat tapes that produce variable reactive forces. Early examples are disclosed in a 1952 U.S. Pat. No. 2,609,193 to Foster, and in later U.S. Pat. Nos. 3,194,343 and 3,194,344 to Sindlinger. Foster discloses a so-called "A"-type spring motor, and Sindlinger discloses a so-called "B"-type spring motor.

In a B-type motor, a length of pre-stressed tape, or ribbon, is wrapped around first and second spools rotatable about spaced parallel axes. Each spool has a circular hub and a pair of circular flanges extending outwardly from the hub in spaced parallel relation. The tape is wrapped about the spool hubs such as in the manner described in referenced Sindlinger patents to form a spring motor assembly. In such an assembly, when one of the spools, such as the driver spool, is rotated about its axis, the tape element reacts as it separates from the driven spool, and causes either more, or less, torque to be required to rotate the driver spool. Either spool may be connected to a variety of prime mover mechanisms, such as a lanyard wrapped about a pulley, so that linear motion of the lanyard is converted to rotational motion. A simple practical application of this mechanism can be found in counterweighting window sashes and window treatments wherein the present invention also finds utility.

In published, but abandoned, U.S. Patent Application published as No. 2009/0108511 A1, several variations of a tapered spring tape are disclosed. In one such variation, illustrated in FIGS. 10 and 11, the tape has a single longitudinal straight edge and a single tapered edge extending between opposite ends. While such a tape may provide some theoretical advantages, the Published Application does not disclose any information about how to manufacture such a tape efficiently.

While the disclosed patented and published flat tapered tape spring motor mechanisms may function satisfactorily for their intended purposes, none is capable of being manufactured efficiently. Thus, there is a need for a flat tapered tape spring that is capable of being manufactured efficiently using commercially available equipment employed in a novel process. Moreover, there is a need for a tapered flat tape B-motor that can be used effectively in product display tethering applications, such as currently provided by the PULLBOX® product manufactured by applicant's assignee Vulcan Spring and Manufacturing, Inc. of Telford, Pa.

DESCRIPTION OF PREFERRED EMBODIMENTS

Figure 1:
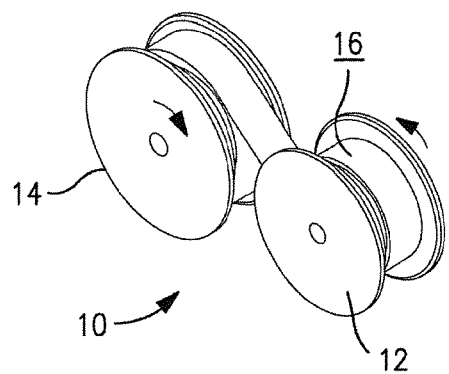
FIG. 1 is a perspective view the major components of a so-called B-type spring motor.
Figure 5:
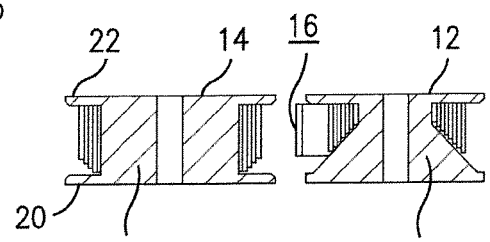
FIG. 5 is a sectional view taken on line 5-5 of FIG. 2.

Referring now to the drawings, FIG. 1 illustrates in perspective the major elements of a B-type flat spring motor 10. These elements include a drive spool 12, a driven spool 14, and a flat tape spring element 16 wrapped around the spools 12, 14 in the manner illustrated. As best seen in FIG. 5, each spool, such as spool 14, is characterized by a central cylindrical hub 18 and a pair of circular flanges 20, 22 extending radially outward in spaced parallel relation from the hub 18. The gap between the hub and the inner surfaces of the flanges provides space for the tape spring 16 to occupy as it is displaced from one spool to the other during operation of the motor. By way of example, when a torque is applied to the driver spool 12 in the counter-clockwise direction of the arrow shown in FIG. 1, the tape 16 advances rightward under the spool hub from a location over the hub on the driven spool 14. The action and reaction of the spring tape is well known and need not be further discussed in detail at this juncture.

Figure 3:
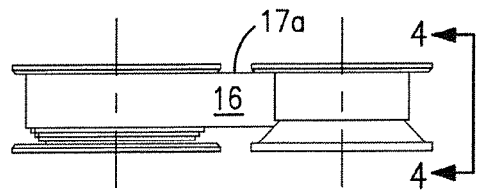
FIG. 3 is an elevational view of the motor illustrated in FIG. 2.
Figure 4:
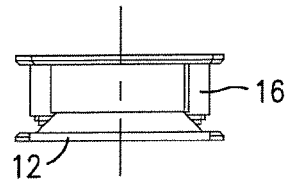
FIG. 4 is an end elevational view taken on line 4-4 of FIG. 3.
Figure 2:
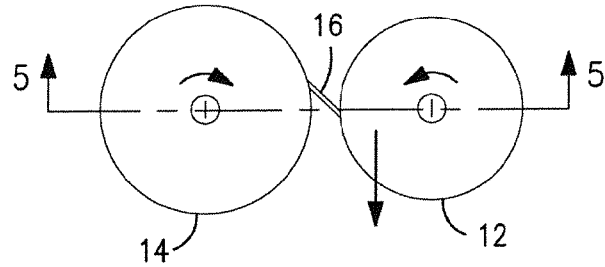
FIG. 2 is a plan view of the motor illustrated in FIG. 1.
Figure 6:
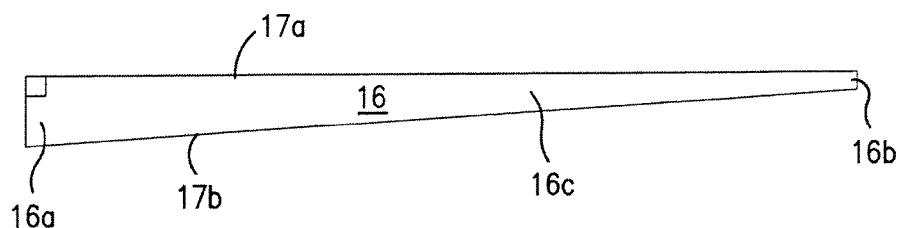
FIG. 6 is a plan view of the spring tape form shown prior to winding into a form suitable for assembly into the motor of FIG. 1.

In one aspect of the invention, as best seen in FIG. 6, the flat spring element 16 is elongate and has end portions 16a and 16b located at opposite ends of a tapered intermediate portion 16c. The spring element 16 has an elongate guide edge 17a that extends the full length of the spring element, and has a free edge 17b that tapers relative to the guide edge 17a between the opposite end portions 16a and 16b. One of the end portions 16b has a short transverse edge portion that cooperates with the guide edge 17a to define the minimum width of the tape at one end portion thereof. The opposite end portion 16a extends transversely across the full width of the tape. This shape is that of a right trapezoid in plan. Preferably, as best seen in FIG. 5, the hub 19 on the companion spool 12 is frustoconical. As seen in FIGS. 3, 4 and 5, the guide edge 17a engages the inside surfaces of the spool flanges to keep the tape properly centered as the tape moves, and the frustoconical surface of the spool hub 19 assists in this function.

Figure 10:
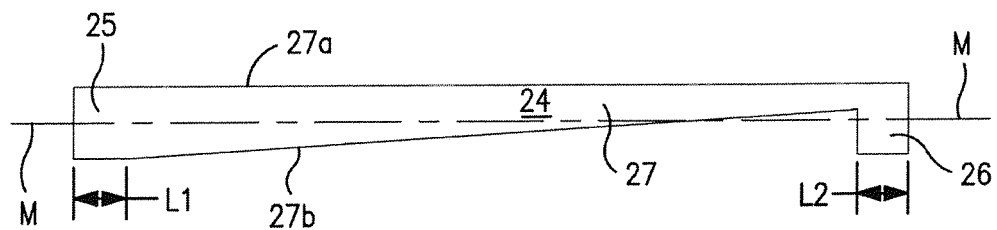
FIG. 10 is a plan view similar to FIG. 6 but of a tape used in the modified embodiment.

If the motor is used in applications where low operating noise is desired, a tapered spring tape 24 of the configuration illustrated in FIG. 10 is desirable. This tape configuration possesses modified end portions that tend to cause the motor to run quietly. In this embodiment, the end portions 25 and 26 of tape 24 have full width sections at both opposite ends of the tapered section 27. As in the FIG. 6 embodiment, the tapered section 27 has a guide edge 27a and a free edge 27b. The guide edge 27a runs the full length L of the tape, and the free edge 27b extends for less than the full length by the dimensions L1 and L2. The lengthwise extent, L1 and L2 of each end portion corresponds to at least X. π. D of the spool hub about which each end portion is to be wrapped. The letter "X" equals the number of complete wraps needed to provide adequate hub/flange/tape engagement for centering the tape ends between the spool flanges during initial periods of extension and retraction of the spring tape. The letter "D" equals the diameter of the spool hub. As seen in FIGS. 3 and 4, the guide edge 17a continually engages one flange on both driver and driven spools to provide proper centering of the tape as it advances and retracts. The free edge tapers at a constant rate and provides the force that varies with length. In this embodiment a frusto conical spool hub 19 (FIG. 5) is not required.

Figure 12:
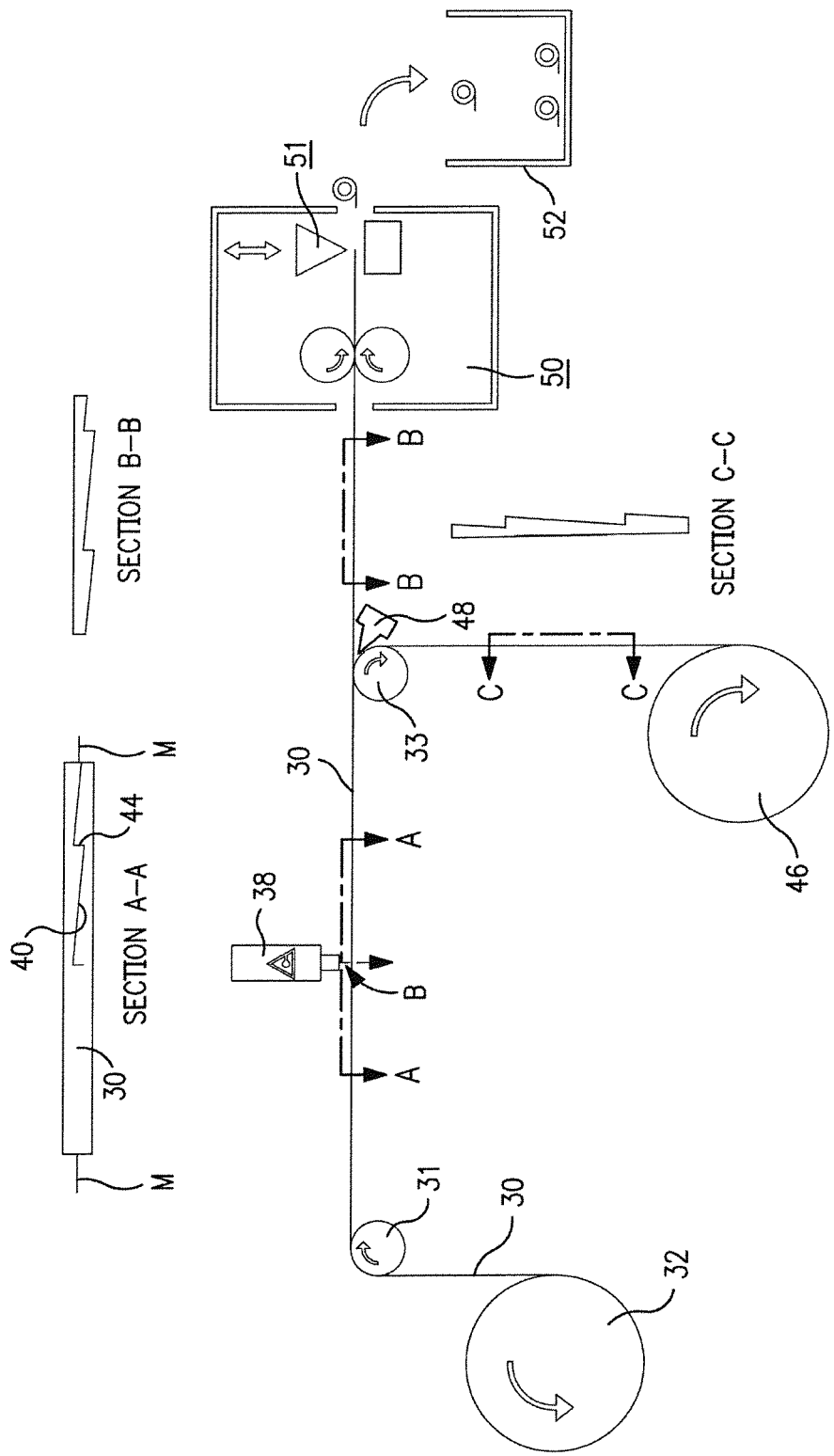
FIG. 12 is a schematic view illustrating the process for making spring tapes, such as the one illustrated in FIG. 10.

Regardless, of which spring tape embodiment is desired, both can be produced by essentially the same process using the same equipment, as illustrated schematically in FIG. 12. In the process, an indeterminate length 30 of flaccid metal tape, preferably of high tensile strength spring steel, is provided on a supply roll 32. The tape 30 is unrolled and advanced lengthwise, such as horizontally, between support and drive rollers 31 and 33. While being advanced, the tape 30 is cut by a laser beam B directed downwardly from a head 38 which is moveable transversely relative to the longitudinal path of movement of the tape 30. The laser beam B makes a linear cut 40 in the tape to provide a free edge 40 that extends at an angle across the longitudinal medial axis M of the tape 30, but does not extend all the way across the tape 30. At predetermined intervals, the laser beam B makes a transverse cut 44 connected to the linear cut 40. The transverse cut 44 forms a continuous free edge in a saw tooth configuration as illustrated in Section A-A downstream of the laser head 38. To make this cut, either the longitudinal motion of the tape is briefly halted, or the laser head 38 is moved above the tape at a velocity that is synchronized with the velocity of the tape. It should be apparent that the rotational speeds of the drive rolls 31 and 33 are synchronized by suitable controls with the motion of the laser head 38.

The continuous free edge cuts 40 and 44 form the tape into undulating complementary shapes on opposite sides of the medial axis M downstream of the laser beam B. As the cut tape advances, it engages a stationary separator nose 48 that splits the tape into two identical complementary shaped strips, Section B-B and Section C-C. One of the strips, Section C-C, advances downwardly onto a storage roll 46 for subsequent use. The other strip Section B-B advances horizontally into a spring coiler 50 which pre-stresses the strip by known techniques, and then cuts the stressed strip to a desired length. The operation of the spring coiler 50 is coordinated with the linear speed of the tape 30. Also, a suitable slack provider may be emplaced between the separator nose 48 and the coiler 50, as well known in the art. The thus-coiled tapered spring tape 30 is discharged into a collection bin 52 for further processing, such as customary heat treating, before being assembled into a spring motor. Preferably, the end portions of the tape are formed with keyholes for engaging fastener lugs on the spool hubs, as known in the art.

In the above-described process, the spring tape 30 is cut completely widthwise in the coiler 50 by means of a die 51. When the cut is aligned with the transverse cuts, shown in Section B-B, the resulting strip has a wide end, and a narrow end, and yields a tape form as illustrated in FIG. 6. Such a tape spring is useful in applications where a very quiet running motor is not required.

It is important to note that Section B-B is the complement to Section C-C. Thus, it can be further processed in the same manner as Section B-B, as by being removed from its storage reel and fed into the same, or a parallel, coiling machine. The point is that the complementary cutting ensures that none of the material of the flaccid starting tape material 30 is wasted.

Figure 11:
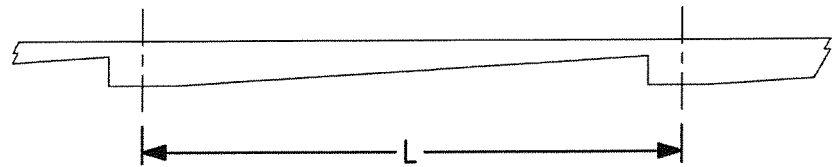
FIG. 11 is a plan view of a length of tape prior to being cut to length to form the tape of FIG. 10.
Figure 7:
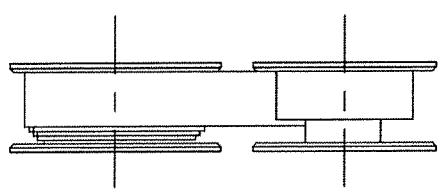
FIG. 7 is an elevational view similar to FIG. 3 but of a modified embodiment.
Figure 8:
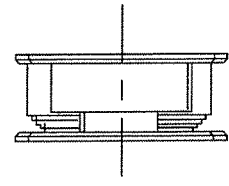
FIG. 8 is an end view similar to FIG. 4 but of the modified embodiment.
Figure 9:
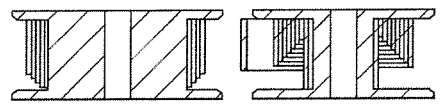
FIG. 9 is a sectional view similar to FIG. 5, but of the modified embodiment.

In order to produce the spring tape embodiment of FIG. 10, the laser cutting beam B is held stationary adjacent one, or the other, edges of the tape for brief periods of time as the tape advances. As a result, the laser beam B cuts the tape lengthwise for predetermined lengths L1 and L2 before resuming its transverse crosswise motion, as described above. This causes the opposite ends of the tape to have full width sections at both opposite ends, as shown in FIGS. 10 and 11 for purposes previously discussed.

In the illustrated embodiment, the undulating free edge is linear, having tapered sections and transverse sections. There may, however, be applications where these undulating free edges may have a long-wave sinusoidal shape. Whether the free edge is linear, or long-wave sinusoidal, or a is composed of combination of curved and straight sections, the important aspect of efficient production is to provide complementary shapes on opposite sides of the medial axis of the tape so that minimal material is wasted in making the finished tape element.

The invention claimed is:

1. A method of making a flat rolled spring element capable of providing a reactive force that varies with extension tangentially from its rolled state, comprising the steps of:
   providing an indeterminate length of flaccid tape having a pair of parallel edges defining therebetween a constant widthwise dimension of the tape,
   advancing said tape lengthwise, and while said tape is advancing,
   cutting said tape lengthwise and partially widthwise between said edges to form an undulating cut and cutting said tape to form a running cut extending in substantially parallel relation to said edges and intersecting said undulating cut such that a complementary pair of separate co-extending tape strips is formed, and thereafter
   separating one of said tape strips from the other for coiling about a tool to form said flat rolled spring element.

2. A method according to claim 1, wherein said cutting step is performed by directing a laser beam through said tape.

3. A method according to claim 2, wherein said laser beam is displaced widthwise during said cutting step to form said undulating cut.

4. A method according to claim 3, wherein, during said cutting step, said laser beam is directed to cut along at least one of said edges to form said running cut such that said running cut extends in substantially parallel relation to said edge and intersects said undulating cut.

5. A method according to claim 4, wherein said running cut is repeated at periodic intervals during said cutting step.

6. A method according to claim 1, wherein, during said separating step, said tape strips are displaced for movement in diverging paths.

7. A method according to claim 6, wherein one of said diverging paths leads to a coiling tool and the other of said diverging paths leads to a take-up reel.

8. A method according to claim 1, further comprising the steps of coiling said one of said tape strips and thereafter severing the coiled tape strip completely widthwise after said coiling step.

9. A method according to claim 1, wherein forming said running cut is repeated at periodic intervals during said cutting step.

10. A method of making a flat rolled spring element, comprising the steps of:
    providing an indeterminate length of a flaccid metal tape capable of being pre-stressed into a rolled coil and having a pair of parallel edges defining therebetween a constant widthwise dimension of the metal tape;
    advancing said metal tape lengthwise;
    during said advancing step, cutting said metal tape lengthwise and partially widthwise between said edges by directing a laser beam through said metal tape to form an undulating cut such that a complementary pair of separate co-extending first and second metal tape strips is formed, wherein, during said cutting step, said laser beam is directed to cut said metal tape to form a running cut extending in substantially parallel relation to said edges and intersecting said undulating cut; and after said cutting step, separating the first metal tape strip from the second metal tape strip, coiling the first metal tape strip about a coiling tool, and thereafter severing the first metal tape strip completely widthwise after said coiling step to form a flat rolled spring element capable of providing a reactive force that varies with extension tangentially from its rolled state.

11. A method according to claim 10, wherein forming said running cut is repeated at periodic intervals during said cutting step.

12. A method according to claim 10, wherein said laser beam is displaced widthwise during said cutting step to form said undulating cut, and wherein each of said first and second metal tape strips has a continuous linear guide edge defining a lengthwise dimension and an opposite free edge extending in non-parallel relation with said guide edge as a result of said cutting step.

13. A method according claim 12, wherein said opposite free edge of each of said first and second metal tape strips has a saw tooth configuration.

14. A method according to claim 12, wherein, during said separating step, said first and second metal tape strips are displaced for movement in diverging paths.

15. A method according to claim 14, wherein one of said diverging paths leads to said coiling tool and the other of said diverging paths leads to a take-up reel.

16. A method according to claim 12, wherein said metal tape is made of high-tensile strength spring steel.

* * * * *